No. 805,683. PATENTED NOV. 28, 1905.
J. B. STRAIGHT.
FEED TROUGH.
APPLICATION FILED JUNE 19, 1905.
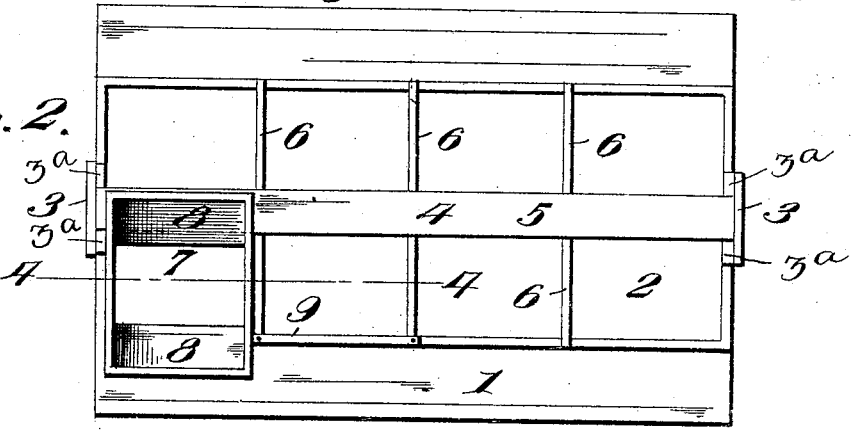
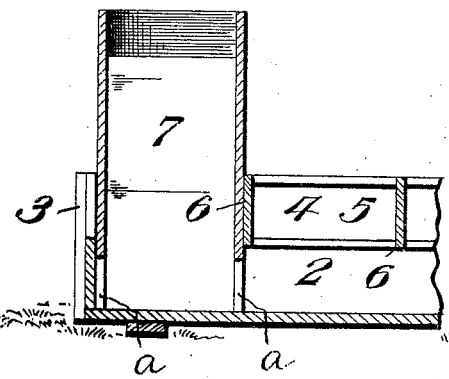 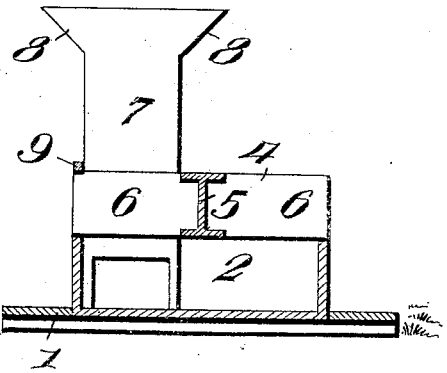
Witnesses
Inventor
James B. Straight
by H. R. Wilson
Attorney

UNITED STATES PATENT OFFICE.

JAMES B. STRAIGHT, OF BATES CITY, MISSOURI.

FEED-TROUGH.

No. 805,683.　　　　Specification of Letters Patent.　　　Patented Nov. 28, 1905.

Application filed June 19, 1905. Serial No. 266,028.

*To all whom it may concern:*

Be it known that I, JAMES B. STRAIGHT, a citizen of the United States, residing at Bates City, in the county of Lafayette and State of Missouri, have invented certain new and useful Improvements in Feed-Troughs; and I do declare the following to be a full, clear, and exact description of the invention, such as will enable others skilled in the art to which it appertains to make and use the same.

This invention relates to improvements in feed-troughs.

The object of this invention is to provide a feed-trough for hogs or stock which is so constructed and arranged as to prevent the crowding and fighting of the animals feeding therefrom and which will also prevent the hogs or other animals from getting into the receptacle or from wasting the food placed therein.

A further object is to provide a feed-trough of this character the parts of which are suitably connected, whereby the same may be taken apart to facilitate the cleaning thereof.

In the accompanying drawings, Figure 1 is a side elevation of the trough constructed in accordance with the invention. Fig. 2 is a top plan view of the same. Fig. 3 is a vertical cross-sectional view on the line 3 3 of Fig. 1 looking in the direction of the arrow, and Fig. 4 is a vertical longitudinal sectional view on the line 4 4 of Fig. 2.

Referring more particularly to the drawings, 1 denotes a base upon which is arranged a trough or receptacle 2, into which the food or water for the stock is placed. Secured to the ends of the receptacle 2 are upwardly-projecting guide-standards 3. Cleats $3^a$ are secured to the guide-standards 3. Adapted to rest upon the upper edge of the receptacle 2 is a rack 4, said rack consisting of a central longitudinally-disposed partition 5, with which are connected laterally-projecting partitions 6, which extend through said central partition to the adjacent opposite sides of the receptacle, upon the upper edge of which said lateral partitions are adapted to rest. The ends of the partition 5 are fitted between the cleats $3^a$. There may be any suitable number of lateral partitions 6, and they are placed apart a sufficient distance to permit the head of one animal to be projected between them and into the receptacle 2, thus preventing the crowding or fighting of the animals over the food and also preventing hogs or other stock from getting into the trough or spilling the contents therefrom.

Arranged in one part of the receptacle between the adjacent end of the central partition and the adjacent lateral partition is a feed-chute 7, said chute being here shown and is preferably constructed in the form of a rectangular vertically-disposed box, on the upper end of which are arranged flaring or inclined sides 8, by which the placing or pouring of the food into the chute is facilitated. In the sides of the lower end of the chute 7 are formed openings $a$, and the food or water may pass into the receptacle 2 through one of these openings. In order to removably support the chute 7, a horizontally-disposed retaining-bar 9 is secured to the edges of the adjacent vertical partitions of the rack in position to engage the side of the chute, as shown.

By constructing the rack and receptacle as herein shown and described they may be readily separated to facilitate the cleaning thereof and will provide an efficient feed-trough for the purposes hereinbefore described.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of the invention.

Having fully described my invention, what I claim as new, and desire to secure by Letters Patent, is—

In a feed-trough the combination with a receptacle of a rack adapted to rest on said receptacle, said rack consisting of a central longitudinally-disposed partition and a series of transversely-disposed partitions arranged to form feeding-compartments, upwardly-projecting guide-standards secured to the ends of the receptacle to receive the ends of said rack thereby removably securing the rack on the receptacle and a feed-chute arranged in said receptacle and removably supported by said rack, substantially as described.

In testimony whereof I have hereunto set my hand in presence of two subscribing witnesses.

JAMES B. STRAIGHT.

Witnesses:
    JOHN T. WAGONER,
    WM. A. MOORE.